Patented Aug. 29, 1944

2,357,073

UNITED STATES PATENT OFFICE 2,357,073

ADHESIVE COMPOSITION

Wyly M. Billing, Wilmington, Del., assignor to Hercules Powder Company, Wilmington, Del., a corporation of Delaware No Drawing. Application November 27, 1940, Serial No. 367,382

15 Claims. (Cl. 106—144)

This invention relates to adhesive compositions and more particularly to adhesive compositions containing water-soluble film-forming materials.

Water-soluble film-forming materials such as starch, sugars, protein materials as casein, animal glue, gelatin, etc., find wide usage commercially in adhesive applications. When used alone, these water-soluble film-forming adhesive materials usually provide films which are too brittle for many uses, which are too water sensitive, and which are deficient in adhesive characteristics for providing satisfactory adhesion to nonporous surfaces. It has been customary to plasticize such adhesive materials by means of hygroscopic plasticizing agents such as glycerin, aliphatic alcohols, sugar alcohols, sulfonated oils, alkylolamines, and the like. Such plasticizers promote the absorption of water and the absorbed water serves as a plasticizing agent for the film-forming adhesive ingredient. While such plasticizers may be satisfactory for some applications of the adhesive compositions, they are undesirable for other applications for several reasons. They reduce the internal adhesive strength of the film-forming ingredients with a resulting decrease in the binding action of the adhesive composition. They do not contribute to the adhesive characteristics of the film-forming ingredient and usually increase the water sensitivity of the adhesive.

It is an object of this invention to provide improved plasticized adhesive compositions containing water-soluble film-forming materials as adhesive components. It is a further object to provide improved plasticizers for water-soluble film-forming materials which overcome the above disadvantages of the plasticizers which have been used heretofore. Other objects of the invention will appear hereinafter.

The above objects may be accomplished in accordance with this invention by use of a glycol ester of a rosin having a drop melting point within the range of about 25° C. to about 80° C. as a plasticizer for water-soluble film-forming materials. It has been found that glycol esters of rosins in addition to plasticizing the water-soluble film-forming materials reduce their water sensitivity, increase their adhesive qualities, and improve their wetting power. The use of such improved plasticizers therefore makes it possible to utilize water-soluble film-forming materials in a highly improved manner in the adhesive field.

The water-soluble film-forming materials which are effectively plasticized by the improved plasticizers in accordance with this invention comprise the general class of materials used in the trade as the base of water-soluble adhesive compositions and include such materials as starches, sugars, protein materials as casein, soy bean flour, animal glue, gelatin, water-soluble cellulose esters and ethers such as methyl cellulose, and the like.

The glycol esters of rosins which possess the desirable plasticizing qualities utilized in this invention include the various glycol esters of rosins such as the ethylene glycol, propylene glycol, diethylene glycol, triethylene glycol, trimethylene glycol, tetraethylene glycol, etc., esters of rosin acids or rosins such as, for example, wood rosin, gum rosin, hydrogenated forms thereof, polymerized forms thereof, heat-treated forms thereof, as well as the acids contained therein such as abietic acid, pimaric acid, sapinic acid, dihydroabietic acid, tetrahydroabietic acid, etc. The glycol esters utilized will all have melting points in the range of about 25° C. to about 80° C. Preferably the esters melting from about 35° C. to about 70° C. will be used.

The amount of the glycol ester of a rosin which it will be desirable to incorporate with the water-soluble film-forming ingredient in the adhesive composition will depend on the particular glycol ester and the specific water-soluble film-forming component of the adhesive used. With use of starch, for example, an amount up to about 40% by weight of the glycol ester, based on the weight of the starch, will provide the above-mentioned improved properties in the adhesive. With protein materials such as casein, an amount of the glycol ester up to about 30% by weight of the casein will provide the desired improvement. In general, the amount of glycol ester of a rosin incorporated with the water-soluble film-forming component will fall within the range of about 5% to about 60% by weight of the water-soluble film-forming material and preferably the amount used will fall within the range of about 10% to about 40% of the weight of the water-soluble film-forming ingredient.

The glycol ester of rosin may be incorporated with the water-soluble film-forming material in an aqueous medium by any suitable procedure, such as by dispersing the glycol ester in this medium, or by blending an aqueous dispersion of the glycol ester with an aqueous dispersion of the film-forming material, or by adding the glycol ester to an aqueous solution of the water-soluble film-forming material and emulsifying the mixture by means of the emulsifying action of the dissolved film-forming material, etc. The glycol ester of rosin may be dispersed in water in the molten form or in the form of a solution in an organic solvent by means of alkali or a suitable emulsifying agent. Emulsifying agents such as, for example, the alkali metal salts of the higher aliphatic half ester sulfates, as sodium lauryl sulfate, sodium stearyl sulfate, sulfonated oils as sulfonated castor oil, sulfonated olive oil, soaps as sodium stearate, sodium oleate, potassium oleate, alkali metal salts of alkyl naphthalene sulfonic acids, as sodium butyl naphthalene sulfonate, sodium isopropyl naphthalene sulfonate, etc., may be employed.

The use of the improved plasticizers in accordance with this invention makes it possible to provide adhesive compositions having a variety of applications which exhibit a marked improvement over the use of the adhesive compositions without plasticizers or with plasticizers such as have been used in the past. The improved adhesive compositions prepared in accordance with this invention may thus be used in pigmented coating compositions for the printing and coating of paper, textile fabrics, leather, etc., to provide binding action on the pigments. They may be used in cold water paints with proteins such as casein where their binding action provides improved results in the coating of structural materials such as wallboards of either cellulose or mineral origin, plastered surfaces, cemented surfaces, wood, etc. In the production of abrasive papers with use of animal glue as the adhesive to bind the abrasive materials such as silica, silicon carbide, metal dust, the improved resinous plasticizers provide greater adhesive qualities and reduced water sensitiveness. In the production of laminated materials with use of starch as the adhesive, such as in the manufacture of paper cartons, the improved plasticizers provide greater adhesiveness and lowered water sensitivity. The adhesive compositions including the water-soluble film-forming materials plasticized in accordance with this invention will be found to exhibit considerable improvement over the film-forming materials alone or plasticized with the prior hygroscopic plasticizers in many other applications in which the adhesive qualities of the water-soluble film-forming materials are utilized.

As indicated above the adhesive compositions described in accordance with this invention may contain coloring matters such as pigments, mineral fillers such as coating clays or titanium dioxide pigments as well as other materials normally used with water-soluble film-forming adhesive compositions.

As illustrative of the improvement in adhesive compositions provided by this invention the following examples may be cited. In the examples all proportions are by weight unless otherwise indicated.

Example 1

A diethylene glycol ester of wood rosin having an acid number of about 8 and a melting point of 50° C. was dissolved in xylene to give an 80% solution. This solution was then emulsified in water with use of the sodium salt of sulfonated lauryl alcohol as emulsifying agent to give a dispersion containing about 33% of the rosin ester. The emulsion was stabilized by passage through a colloid mill. Twenty-five parts of this emulsion were added to a 25% suspension of converted starch in water and the mixture agitated at 75° C. for 15 minutes to insure gelatinization of the starch. To illustrate the use of this adhesive composition, 200 parts of a 50% slurry of clay in water were added to 100 parts of the plasticized starch composition and the mixture obtained applied by means of a brush coater to 40 pound raw paper stock to produce a coated paper having a basis weight of 15 pounds per 3000 square feet. The coated paper obtained exhibited excellent adhesion of the clay and was free from the dusty and extreme water sensitivity characteristics of the usual starch-clay coated papers. The printing properties of the coated paper were excellent.

Example 2

Fifty parts of casein were allowed to soak in 200 parts of water at 50° C. for 1 hour after which 7.5 parts of sodium tetraborate were added. A clear aqueous solution resulted. Then to 100 parts of coating clay 32 parts of the 33% aqueous dispersion of the diethylene glycol ester of wood rosin described in Example 1 were added. This mixture was diluted with 70 parts of water and then 100 parts of the above casein solution were mixed in. The adhesive composition resulting was applied to paper by means of a Martinson knife coater to produce a coating weight of approximately 15 pounds per 3000 square feet. The paper was then dried and calendered in the usual manner. The coated paper was then printed with a high gloss printing ink. In comparison to a casein-clay coated paper produced in the usual manner without use of a plasticizer, the printed, coated paper showed improved hold-out of the ink, improved calendering and gloss, as well as greater flexibility of the coating. These improved properties are the direct result of the incorporation of the glycol ester of rosin in the formulation.

Example 3

Sixty parts of casein were dissolved in 340 parts of water containing 8.4 parts of sodium carbonate at 50° C. To 56 parts of this solution 4.5 parts of an 80% xylene solution of the diethylene glycol ester of wood rosin were added. In this mixture 48 parts of a 75% slurry of a titanium dioxide pigment in water were incorporated to form a smooth homogeneous mix. This composition was applied to a cellulosic wallboard such as "Celotex" and also to an asbestos-cement wallboard such as is known in the trade as "Transite." After drying of the coated surface, it was found that the plasticized casein composition provided a high degree of adhesion between the pigment and the surface. The coated surface was resistant to chipping and rupturing of the film whereas with use of similar compositions without the glycol ester of rosin brittle films which are not resistant to chipping result. The wallboard coated in the above manner was sprayed with an aqueous solution of formaldehyde, dried 2 minutes at 120° F. after which it was found to be effectively waterproofed.

Example 4

Thirty parts of No. 1 animal glue were dissolved in 70 parts of water at 50–60° C. To this glue solution were added 13.3 parts of a 75% by weight ethyl alcohol solution of a diethylene glycol ester of wood rosin having an acid number of 85 and containing 10% of ammonium hydroxide based on the weight of the resin. The resin solution was uniformly dispersed in the glue solution. This plasticized adhesive composition was then coated by means of rollers on a 70 pound unbleached kraft paper to provide a coating of 15 pounds of solids per 3000 square feet. To the wet coating flint particles of No. 1 grade were applied evenly and the paper festooned, dried and wound. The original plasticized glue solution was then diluted to about 15% by weight solids and a top coating of the diluted composition applied to the sand coated paper. After drying and sheeting, the sandpaper exhibited improved flexibility and decreased water sensitivity in comparison with a sandpaper prepared with use of an unplasticized glue solution.

*Example 5*

A 25% mixture of starch in water was cooked with agitation to 65° C. To 100 parts of the starch solution at this temperature, 40.8 parts of the 33% aqueous dispersion of the diethylene glycol ester of rosin described in Example 1 were added. The plasticized starch solution was then cooked to 75° C. for 15 minutes to insure gelatinization of the starch and intimate mixture of the resin therewith. The adhesive composition so produced was then coated on carton paper stock of about 6–8 mils thickness which was then laminated to itself and dried for 5 minutes at 120° F. The adhesive film was more water resistant and possessed greater strength than a similar lamination prepared with unplasticized starch.

*Example 6*

A suspension of 28 parts of converted starch in 136 parts of water was cooked to 65° C. and 36 parts of the 33% emulsion of the diethylene glycol ester of rosin as prepared in Example 1 were added. The solution was cooked to a temperature of 75° C. for 15 minutes and then cooled. To 100 parts of the plasticized starch solution 133 parts of a 75% aqueous dispersion of a blue pulp pigment were incorporated. The pigmented plasticized starch solution was coated on a 20 pound stock paper using a coating bar to provide a film of approximately 6 mils thickness. After drying, the coated paper exhibited less tendency to dust than a similar coating prepared with unplasticized starch and also showed less tendency to curl in the dry state.

*Example 7*

Twelve parts of raw cornstarch and 3 parts of British gum were cooked in 85 parts of water at a boiling temperature for 15 minutes. To this starch mixture 10 parts of a 100% titanium dioxide pigment (Ti-Pure FF) mixed with 6 parts of water were added. Then to this pigmented starch composition, 10 parts of a 33% emulsion of an 80% xylene solution of a triethylene glycol ester of hydrogenated rosin prepared as in Example 1 were added and the mixture stirred to give a smooth printing paste. The paste was applied to a textile fabric providing a print in which the pigment was more tightly bound to the fabric and the printed portion was less stiff in comparison with a similar print made with the straight starch composition.

By utilizing glycol esters of rosins such as defined above as plasticizers for water-soluble film-forming materials to provide compositions useful in various adhesive compositions, several definite advantages in the use of such film-forming adhesive materials are realized. Thus, in addition to plasticizing the water-soluble film-forming material, these novel plasticizers reduce their water sensitivity, increase their adhesive qualities, and improve their wetting properties. These novel plasticizers provide a distinct improvement over the hygroscopic plasticizers which have been heretofore used and make it possible to provide improved adhesive compositions based on water-soluble film-forming adhesive materials.

It will be understood that the details and the specific examples are illustrative only and that the invention as herein broadly described and claimed is in no way limited thereby.

This application forms a continuation-in-part of my application, Serial No. 280,807, filed June 23, 1939, now Patent No. 2,288,432, issued June 30, 1942, entitled "Textile finishing," which is in turn a continuation-in-part of my application, Serial No. 223,227, filed August 5, 1938, entitled "Textile finishing, diethylene glycol ester of rosin."

What I claim and desire to protect by Letters Patent is:

1. An adhesive composition comprising a film-forming material capable of being solubilized in aqueous media and a glycol ester of a rosin acid, said ester having a melting point between about 25° C. and about 80° C.

2. An adhesive composition comprising a film-forming material capable of being solubilized in aqueous media and a glycol ester of a rosin acid, said ester having a melting point between about 35° C. and about 70° C.

3. An adhesive composition comprising a film-forming material capable of being solubilized in aqueous media and a glycol ester of a rosin acid present in an amount between about 10% and about 40% by weight of said material, said ester having a melting point between about 25° C. and about 80° C.

4. An adhesive composition comprising casein and a glycol ester of a rosin acid, said ester having a melting point between about 25° C. and about 80° C.

5. An adhesive composition comprising a film-forming material capable of being solubilized in aqueous media and a diethylene glycol ester of a rosin acid.

6. An adhesive composition comprising casein and a diethylene glycol ester of a rosin acid.

7. An adhesive composition comprising casein and a diethylene glycol ester of a hydrogenated rosin acid.

8. An adhesive composition comprising a film-forming material capable of being solubilized in aqueous media and an ethylene glycol ester of a rosin acid.

9. An adhesive composition comprising casein and an ethylene glycol ester of a rosin acid.

10. An adhesive composition comprising casein and an ethylene glycol ester of a hydrogenated rosin acid.

11. An adhesive composition comprising a film-forming material capable of being solubilized in aqueous media and a triethylene glycol ester of a rosin acid.

12. An adhesive composition comprising casein and a triethylene glycol ester of a rosin acid.

13. An adhesive composition comprising casein and a triethylene glycol ester of a hydrogenated rosin acid.

14. A coated article having a coating comprising a pigment, a film-forming material capable of being solubilized in aqueous media, and a glycol ester of a rosin acid, said ester having a melting point between about 25° C. and about 80° C.

15. A laminated article the laminae of which are bonded together by means of an adhesive composition comprising a film-forming material capable of being solubilized in aqueous media and a glycol ester of a rosin acid, said ester having a melting point between about 25° C. and about 80° C.

WYLY M. BILLING.